July 2, 1946.   L. N. HAMPTON   2,402,998

WIPING PLATE

Filed July 13, 1943

INVENTOR
L. N. HAMPTON
BY J. MacDonald
ATTORNEY

Patented July 2, 1946

2,402,998

UNITED STATES PATENT OFFICE 2,402,998

WIPING PLATE

Leon N. Hampton, New York, N. Y., assignor to Bell Telephone Laboratories, Incorporated, New York, N. Y., a corporation of New York Application July 13, 1943, Serial No. 494,573

1 Claim. (Cl. 113—111)

This invention relates to wiping devices of the type used for cleaning soldering coppers.

Wiping devices of the type above mentioned generally consist of a piece of asbestos cloth impregnated with an abrasive material serving to clean the oxidized portion of the tip by a rubbing action preliminary to the retinning of such surface in the well-known manner.

While the use of these wiping devices has given satisfactory results for the cleaning of the working surface in ordinary soldering coppers by the use of abrasive for the cleaning of iron covered copper tips, now in general use, it was found that the iron coating wore out after a relatively few cleaning operations with the consequent frequent oxidizing and necessary cleaning and retinning operation of the tip.

The object of the invention is the provision of a cleaning plate for iron surfaced soldering tips which will be simple, convenient in use and which will improve the tinned surface of the iron of a soldering tip during its cleaning operation.

A feature of the invention is the provision of a highly polished tinned steel plate against which the iron working surface of the soldering tip is rubbed for cleaning, the resiliency of the plate controlling the contact pressure between the plate and the soldering tip being cleaned.

Another feature is the provision of a frame for the tinned steel plate, said plate and the frame each having interlocking portions to hold them in assembled relation with each other.

Another feature is the provision of means in the frame for limiting the flexing of the tinned plate so as to prevent its disengagement from the interlocking portions of the frame.

Other novel features and advantages of the invention will appear from the following description and by the claim appended thereto reference being had to the accompanying drawing in which:

Figure 1:
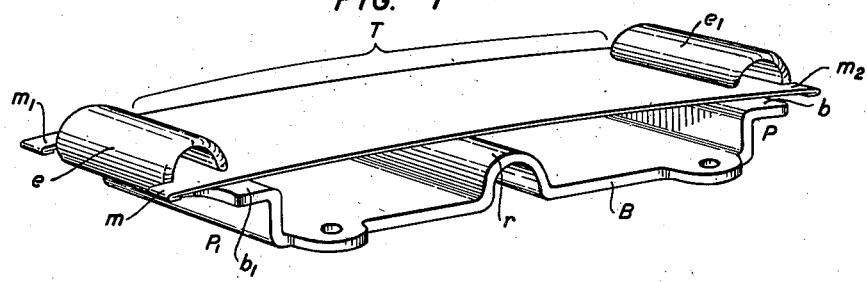
Fig. 1 is an assembly view shown in perspective.
Figure 2:
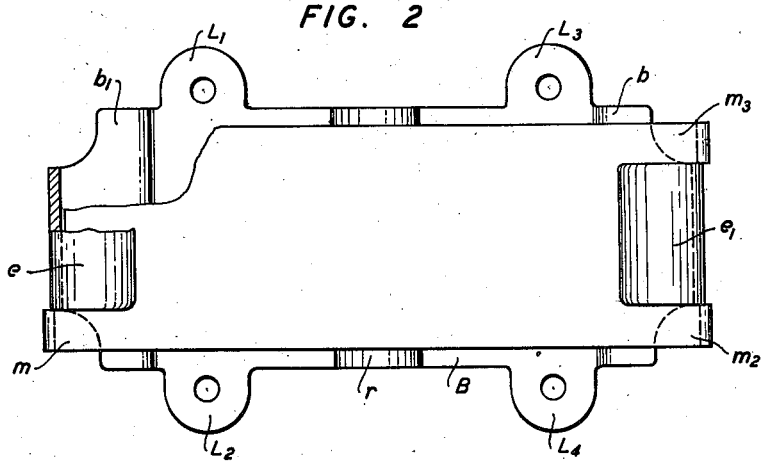
Fig. 2 is a top assembly view shown with the supporting frame and the tinned plate with portions broken away.
Figure 3:
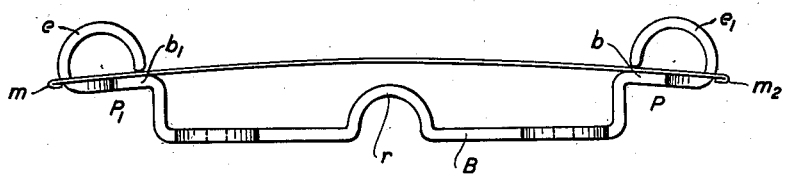
Fig. 3 is a side view.

According to the wiping plate of this invention, a substantially rectangularly shaped blank B, Figs. 1, 2 and 3, is punched from a metallic sheet to form a mounting or frame comprising portions P and P1 at its opposite ends bent at a number of angular directions relative to the plane of the blank B to form the bearing surfaces $b$ and $b1$, and upturned portions $e$ and $e1$, the edges of which extend a distance from the surfaces of bearing portions $b$ and $b1$, an amount substantially equal to the thickness of a plate T of resilient material as spring steel. The plate T is provided at its opposite ends with prong-like elements $m$—$m1$ and $m2$—$m3$ engaging the sides of the upturned portions $e$ and $e1$ of the frame so as to hold the plate against lateral movement, while the edges of the upturned portions $e$ and $e1$ hold the plate T in position on the bearing portions $b$ and $b1$ of the frame. The plate T is of such a length relative to the distance between the upturned portions $e$ and $e1$ to cause the plate to bulge upwardly at its middle length portion due to the angle the bearing portions $b$ and $b1$ make relative to the base B of the frame thus formed.

Base B is formed at its middle length portion and transverse thereof with a projection $r$ serving as a stop for limiting the downward deflection of the plate so as to prevent the damaging of this plate whenever excess pressure is applied at its middle portion in the cleaning operation of the soldering copper.

Figure 4:
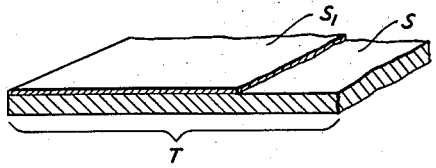
Fig. 4 is a portion of the tinned steel plate enlarged.

The plate T which as above described is preferably made of spring steel has a highly polished surface provided with a tin coating $s1$ (Fig. 4) on which the tinned working surface of the soldering copper is rubbed for cleaning or retinning any point of the entire working surface thereof which may have oxidized during the soldering operations.

The base B is formed with a plurality of similarly shaped lugs L1, L2, L3 and L4 provided for securing the frame assembly thus formed on a working bench (not shown).

Wiping plates constructed according to the features of the invention have been found in actual use to perform cleaning and retinning operations efficiently by the simple rubbing of the iron tinned surface of the soldering copper, thus prolonging the working life of such soldering copper with the incident saving of considerable time and expense in such cleaning and retinning operations.

What is claimed is:

A wiping device for a soldering copper having an electrodeposited iron working surface, said device comprising a tinned rectangularly shaped resilient steel plate, a base having bent portions extending a small distance from the surface of said base to form bearing points, the ends of said plate resting on said bearing points and having longitudinally extending pairs of prong-shaped elements engaging with means formed with said base for securely interlocking therewith, and an abutment carried by said base for limiting the deflecting movement of said plate upon a pressure applied thereon when rubbing the soldering copper, the resiliency of said plate determining the cleaning effect on the iron surface of the soldering copper.

LEON N. HAMPTON.